United States Patent
Frank

(10) Patent No.: US 10,645,540 B2
(45) Date of Patent: May 5, 2020

(54) APPLYING RANDOM PHASE TO MULTICAST DATA

(71) Applicant: Lenovo (Singapore) PTE. LTD., New Tech Park (SG)

(72) Inventor: Colin D. Frank, Park Ridge, IL (US)

(73) Assignee: Lenovo (Singapore) PTE LTD, New Tech Park (SG)

( * ) Notice: Subject to any disclaimer, the term of this patent is extended or adjusted under 35 U.S.C. 154(b) by 0 days.

(21) Appl. No.: 16/025,895

(22) Filed: Jul. 2, 2018

(65) Prior Publication Data

US 2020/0008015 A1     Jan. 2, 2020

(51) Int. Cl.
*H04W 4/06*     (2009.01)
*H04L 12/18*     (2006.01)

(52) U.S. Cl.
CPC .............. *H04W 4/06* (2013.01); *H04L 12/189* (2013.01)

(58) Field of Classification Search
CPC ....... H04W 4/06; H04W 72/04; H04W 12/04; H04W 72/042; H04W 72/1257; H04W 12/10; H04W 64/00; H04W 12/0013; H04W 76/27; H04W 72/0453; H04L 12/189; H04L 27/06; H04L 5/023; H04L 1/06; H04L 1/0071; H04L 5/0007; H04L 5/0044; H04L 5/0037; H04L 5/00; H04L 5/0048; H04L 5/0023; H04L 5/0039; H04L 5/006; H04L 9/0637; H04L 9/3249; H04L 12/18; H03L 7/08; H03L 7/085; H04Q 7/20; H04B 7/02; H04B 7/0619; H04B 7/0452; H04B 7/022; H04B 7/0413; H01Q 21/29; G01S 19/25; G01S 19/05

See application file for complete search history.

(56) References Cited

U.S. PATENT DOCUMENTS

2014/0105120 A1* 4/2014 Jose ..................... H04W 72/042
                                                      370/329
2015/0327232 A1* 11/2015 Chang ................... H04W 56/00
                                                      370/329

FOREIGN PATENT DOCUMENTS

EP           2129152 A1     12/2009
KR        20180010843 A     1/2018

OTHER PUBLICATIONS

PCT/IB2019/000837, "Notification of Transmittal of the International Search Report and the Written Opinion of the International Searching Authority, or the Declaration", PCT, dated Nov. 25, 2019, pp. 1-31.

* cited by examiner

*Primary Examiner* — Hardikkumar D Patel
(74) *Attorney, Agent, or Firm* — Kunzler Bean & Adamson

(57) ABSTRACT

For applying a random phase to blocks within a multicast transmission, methods, apparatus, and systems are disclosed. One apparatus includes a processor and a transceiver that communicates with at least one remote unit. The processor divides a downlink transmission into a plurality of phase blocks, each phase block including a plurality of resource blocks. The processor applies a random phase to signals corresponding to each of the plurality of phase blocks, forming a randomly-phased transmission. Moreover, the transceiver transmits the randomly-phased transmission to the at least one remote unit as multicast data.

20 Claims, 8 Drawing Sheets

APPLYING RANDOM PHASE TO MULTICAST DATA

FIELD

The subject matter disclosed herein relates to electronic communications and more particularly relates to applying a random phase to blocks within a multicast transmission.

BACKGROUND

The following abbreviations and acronyms are herewith defined, at least some of which are referred to within the following description.

Third Generation Partnership Project ("3GPP"), Access and Mobility Management Function ("AMF"), Access Point Name ("APN"), Access Stratum ("AS"), Carrier Aggregation ("CA"), Clear Channel Assessment ("CCA"), Control Channel Element ("CCE"), Channel State Information ("CSI"), Common Search Space ("CSS"), Data Network Name ("DNN"), Data Radio Bearer ("DRB"), Downlink Control Information ("DCI"), Downlink ("DL"), Enhanced Clear Channel Assessment ("eCCA"), Enhanced Mobile Broadband ("eMBB"), Evolved Node-B ("eNB"), Evolved Packet Core ("EPC"), Evolved UMTS Terrestrial Radio Access Network ("E-UTRAN"), European Telecommunications Standards Institute ("ETSI"), Frame Based Equipment ("FBE"), Frequency Division Duplex ("FDD"), Frequency Division Multiple Access ("FDMA"), Globally Unique Temporary UE Identity ("GUTI"), Hybrid Automatic Repeat Request ("HARQ"), Home Subscriber Server ("HSS"), Internet-of-Things ("IoT"), Key Performance Indicators ("KPI"), Licensed Assisted Access ("LAA"), Load Based Equipment ("LBE"), Listen-Before-Talk ("LBT"), Long Term Evolution ("LTE"), LTE Advanced ("LTE-A"), Medium Access Control ("MAC"), Multiple Access ("MA"), Modulation Coding Scheme ("MCS"), Machine Type Communication ("MTC"), Massive MTC ("mMTC"), Mobility Management ("MM"), Mobility Management Entity ("MME"), Multiple Input Multiple Output ("MIMO"), Multipath TCP ("MPTCP"), Multi User Shared Access ("MUSA"), Non-Access Stratum ("NAS"), Narrowband ("NB"), Network Function ("NF"), Next Generation (e.g., 5G) Node-B ("gNB"), Next Generation Radio Access Network ("NG-RAN"), New Radio ("NR"), Policy Control & Charging ("PCC"), Policy Control Function ("PCF"), Policy Control and Charging Rules Function ("PCRF"), Packet Data Network ("PDN"), Packet Data Unit ("PDU"), PDN Gateway ("PGW"), Quality of Service ("QoS"), Quadrature Phase Shift Keying ("QPSK"), Radio Access Network ("RAN"), Radio Access Technology ("RAT"), Radio Resource Control ("RRC"), Receive ("RX"), Switching/Splitting Function ("SSF"), Scheduling Request ("SR"), Serving Gateway ("SGW"), Session Management Function ("SMF"), System Information Block ("SIB"), Transport Block ("TB"), Transport Block Size ("TBS"), Time-Division Duplex ("TDD"), Time Division Multiplex ("TDM"), Transmission and Reception Point ("TRP"), Transmit ("TX"), Uplink Control Information ("UCI"), Unified Data Management ("UDM"), User Entity/Equipment (Mobile Terminal) ("UE"), Uplink ("UL"), User Plane ("UP"), Universal Mobile Telecommunications System ("UMTS"), Ultra-reliability and Low-latency Communications ("URLLC"), and Worldwide Interoperability for Microwave Access ("WiMAX").

UE reception of multicast data transmitted by multiple transmission points may be disrupted due to destructive interference of the multicast signals.

BRIEF SUMMARY

Methods for applying a random phase to blocks within a multicast transmission are disclosed. Apparatuses and systems also perform the functions of the methods.

One method (e.g., of a transmission point) for applying a random phase to blocks within a multicast transmission includes dividing a downlink transmission into a plurality of phase blocks, each phase block including multiple resource blocks. The method includes applying a random phase to signals corresponding to each of the plurality of phase blocks to form a randomly-phased transmission. The method also includes transmitting the randomly-phased transmission as multicast data.

Another method (e.g., of a user equipment) for applying a random phase to blocks within a multicast transmission includes receiving a multicast transmission from a base unit and identifying a plurality of phase blocks in the multicast transmission, each phase block including multiple resource blocks. The method includes performing channel estimation on the plurality of phase blocks and decoding the multicast transmission using the channel estimations.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
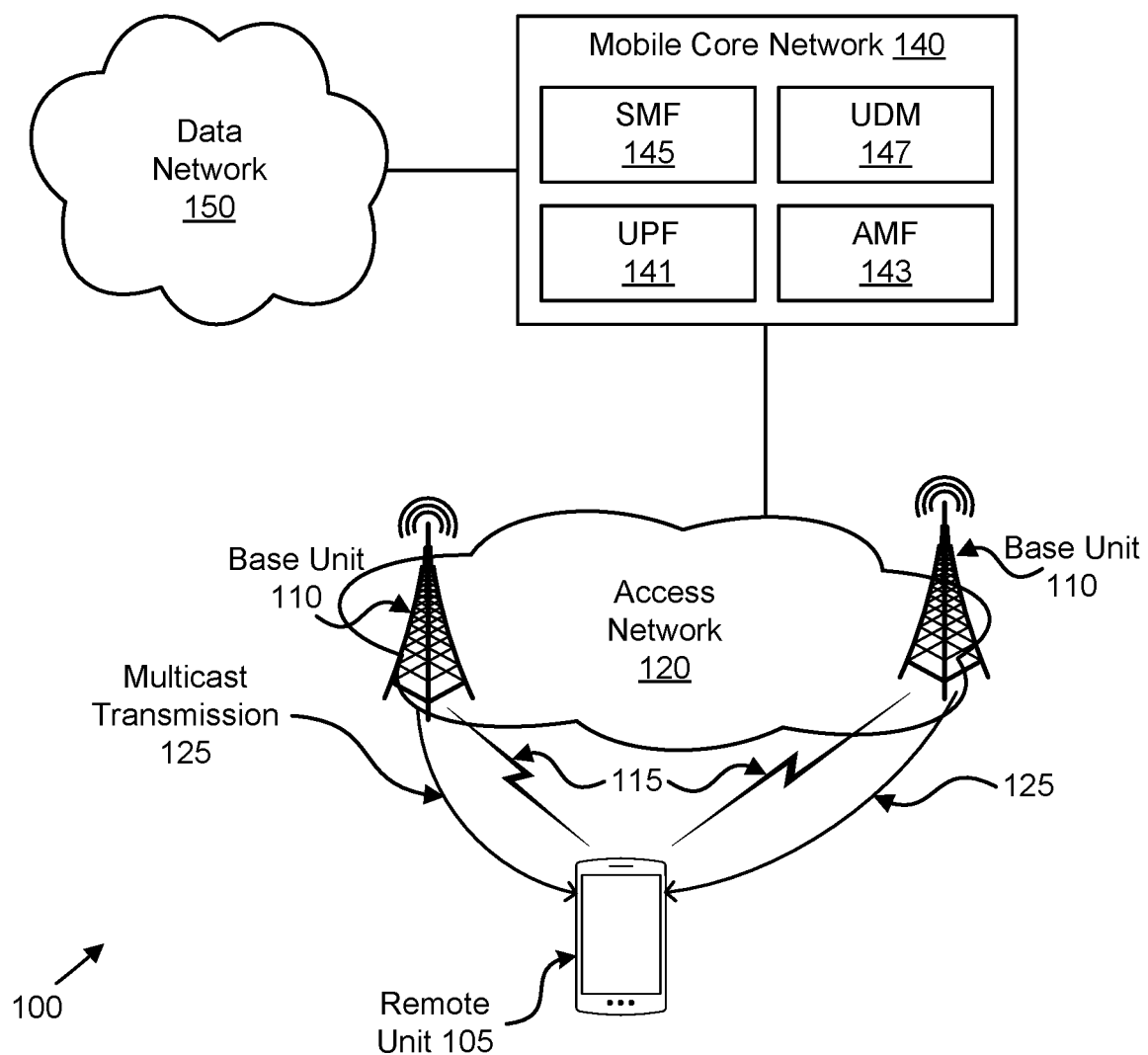
FIG. 1 is a schematic block diagram illustrating one embodiment of a wireless communication system for applying a random phase to blocks within a multicast transmission.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures, including alternate embodiments of like elements.

FIG. 1 depicts a wireless communication system 100 for applying a random phase to blocks within a multicast transmission, according to embodiments of the disclosure. In one embodiment, the wireless communication system 100 includes at least one remote unit 105, an access network 120 containing at least two base units 110, wireless communication links 115, and a mobile core network 140. Even though a specific number of remote units 105, access networks 120, base units 110, wireless communication links 115, and mobile core networks 140 are depicted in FIG. 1, one of skill in the art will recognize that any number of remote units 105, access networks 120, base units 110, wireless communication links 115, and mobile core networks 140 may be included in the wireless communication system 100. In another embodiment, the access network 120 contains one or more WLAN (e.g., Wi-Fi™) access points.

In one implementation, the wireless communication system 100 is compliant with the 5G system specified in the 3GPP specifications. More generally, however, the wireless communication system 100 may implement some other open or proprietary communication network, for example, LTE or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as subscriber units, mobiles, mobile stations, users, terminals, mobile terminals, fixed terminals, subscriber stations, UE, user terminals, a device, or by other terminology used in the art. The remote units 105 may communicate directly with one or more of the base units 110 via uplink ("UL") and downlink ("DL") communication signals. Furthermore, the UL and DL communication signals may be carried over the wireless communication links 115.

The base units 110 may be distributed over a geographic region. In certain embodiments, a base unit 110 may also be referred to as an access terminal, an access point, a base, a base station, a Node-B, an eNB, a gNB, a Home Node-B, a relay node, a device, or by any other terminology used in the art. The base units 110 are generally part of a radio access network ("RAN"), such as the access network 120, that may include one or more controllers communicably coupled to one or more corresponding base units 110. These and other elements of the radio access network are not illustrated, but are well known generally by those having ordinary skill in the art. The base units 110 connect to the mobile core network 140 via the access network 120.

The base units 110 may serve a number of remote units 105 within a serving area, for example, a cell or a cell sector via a wireless communication link 115. The base units 110 may communicate directly with one or more of the remote units 105 via communication signals. Generally, the base units 110 transmit DL communication signals to serve the remote units 105 in the time, frequency, and/or spatial domain. Furthermore, the DL communication signals may be carried over the wireless communication links 115. The wireless communication links 115 may be any suitable carrier in licensed or unlicensed radio spectrum. The wireless communication links 115 facilitate communication between one or more of the remote units 105 and/or one or more of the base units 110.

In various embodiments, the remote units 105 receive data via multicast transmission 125 transmitted simultaneously by multiple base units 110 (referred to herein as "simulcast"). Examples of simulcast services include multi-media broadcast multicast service ("MBMS") and the related enhanced multi-media broadcast multicast service ("E-MBMS") which are used to transmit multicast data (e.g., data which is intended for multiple users) via multiple base units 110 in the access network 120. Examples of multicast data may include the broadcast transmission of television and emergency information. Another example of such a multicast transmission includes the transmission of software updates to phones, tablets, laptops, or other devices served by the network.

Often, the region served by a multicast service (e.g., MBMS service) is much larger than the area covered by a cell (e.g., coverage area of a base unit 110) and most typically spans the region covered by multiple cells (e.g., multiple base units). As a result, in order to serve this region most efficiently, multiple cells/sectors transmit the same data simultaneously using the same time/frequency resources (see multicast transmissions 125). Thus, if any intended user (e.g., remote unit 105) is within range of any of the cells, it will be able to receive the multicast data.

The remote unit 105 receives one or more copies of the multicast transmission, e.g., one copy from each base unit 110 within whose coverage area the remote unit 105 is located Because the base units 110 simultaneously transmit the multicast transmissions 125, there is potential for constructive interference or destructive interference of the signals received at the remote unit 105. Constructive interference of the signals improves reception of the multicast transmissions 125 at the remote unit 105, while destructive interference may disrupt reception of the multicast transmissions 125 at the remote unit 105. Note that a multicast transmission 125 is efficient in the sense that many users are served by the same transmission.

In one embodiment, the mobile core network 140 is a 5G core ("5GC") or the evolved packet core ("EPC"), which may be coupled to a data network 150, like the Internet and private data networks, among other data networks. Each mobile core network 140 may belong to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes multiple control plane functions including, but not limited to, an Access and Mobility Management Function ("AMF") 143, a Session Management Function ("SMF") 145, and a Policy Control Function ("PCF"). Additionally, the mobile core network 140 includes a user plane function ("UPF") 141 and a Unified Data Management ("UDM") 147. Although specific numbers and types of network functions are depicted in FIG. 1, one of skill in the art will recognize that any number and type of network functions may be included in the mobile core network 140.

In some embodiments, the remote units 105 may establish a PDU connection (or a data connection) to the data network 150 via the mobile core network 140 and the access network 120. The mobile core network 140 then relays traffic between the remote unit 105 and a remote host (e.g., media or application server) using the PDU connection to the data network 150.

In order to solve the above-mentioned problem of destructive interference of simultaneously transmitted multicast transmissions 125, a base unit 110 divides a DL transmission of multicast data into multiple sets of resource blocks, these sets being referred to herein as "phase blocks." For each phase block, the base unit 110 selects a random or pseudo-random phase on the interval of [0, $2\pi$) radians and applies the selected phase to the signal transmitted in the phase block. Note that the same random phase is applied to all symbols transmitted in the phase block. Because different base units 110 apply different phases to phase blocks of their transmissions, the sum signal received at the remote unit 105 will be a random variable with average power equal to the sum of the average powers of the signals received from each base unit 110.

In both the LTE and HSPA specifications, there is support for multi-media broadcast multicast service ("MBMS"—also referred to as eMBMS (enhanced MBMS) when transmissions are delivered through an LTE network) which is used to transmit multicast data. As used herein, "multicast data" refers to data which is intended for multiple users. Examples of multicast data may include, but are not limited to, the broadcast transmission of television and emergency information, the transmission of software updates to phones, tablets, laptops, or other devices served by the network, and the like.

In general, the region served by the MBMS service (e.g., the MBMS "service region") is much larger than the area covered by a cell and most typically spans an area covered by multiple cells. In order to serve this region most efficiently, multiple cells/sectors transmit the same data simultaneously using the same time/frequency resources (referred to as "simulcast"). Thus, if any intended user (e.g., remote unit 105) is within range of any of the cells forming the MBMS service region, it will be able to receive the multicast data.

In LTE and HSPA, only a single transmission mode is used for MBMS data, referred to as "Transmission Mode 1." With Transmission Mode 1, the MBMS data is transmitted from each cell/sector using a single antenna port. Note that an "antenna port" is a logical entity (as opposed to a physical antenna) representative of a channel and distinguished by reference signal sequences. In one embodiment, multiple antenna port signals are transmitted on a single transmit antenna. In another embodiment, a single antenna port is spread across multiple transmit antennas.

For MBMS, both the data and the reference symbols are transmitted using this same antenna port. With this transmission method, the channel seen by the remote unit 105 (e.g., a UE) is the sum of the channels that exist between each transmitting base unit 110 (e.g., an eNB) and the remote unit 105. A problem exists with this method in that the channels may add in-phase (also referred to as constructive interference), in which case the strength of the received signal is enhanced, or the signals may add out-of-phase (also referred to as destructive interference), in which case the signals may cancel out even if their transmitted power (e.g., signal strength) is very strong.

At the boundaries of sectors of the same cell, the signal received at the remote unit 105 when each base unit 110 is transmitting individually may be very strong. However, when both base units 110 transmit the same signal at the same time, the two signals may add out-of-phase and cancel out, even though individually each signal is very strong. For line of sight transmission, this can be viewed as a null in the combined antenna pattern due to the fact that the antenna patterns may add in-phase or out-of-phase.

At the boundaries between sectors of different cells, the signal strength is typically much weaker than elsewhere. Again, as in the case of adjacent sectors, the signals at this boundary may cancel if they are equal in amplitude, but opposite in phase. One way to avoid signal cancellation when simulcasting the same signal from multiple base units 110 is to use transmit diversity, such as space-frequency block coding ("SFBC") or space-frequency block coding+frequency-shift transmit diversity ("SFBC+FSTD"). In LTE systems, SFBC is defined for multicast transmission with two antenna ports, while SFBC+FSTD is defined for multicast transmission with four antenna ports. It should be noted that both of these transmission schemes have rate one so that there is no rate loss associated with their use.

There are however, a few disadvantages in using transmit diversity for MBMS transmission (which requires multiple antenna ports) instead of single port transmission. One disadvantage of the transmit diversity schemes is that more reference symbols are required than for single port transmission. For example, SFBC (which uses two antenna ports) requires twice the reference symbol overhead of single port transmission, in terms of both bandwidth and power. As another example, SFBC+FSTD (which uses four antenna ports) requires four times the reference symbol overhead of single port transmission, in terms of both bandwidth and power.

A second disadvantage of transmit diversity for MBMS transmission is that the number of transmission points (e.g., base units 110) visible to a given remote unit 105 may exceed the number of transmission ports defined for the particular transmit diversity scheme. For example, if the number of transmission points visible to a particular remote unit 105 is greater than two, then it will not be possible to achieve full diversity with SFBC transmission as at least two of the transmission points must be assigned the same SFBC port. Here, the transmission points which are assigned the same SFBC port will not achieve full diversity since the signal-to-noise ratio of the resulting simulcast signal will depend on the relative phase of the two transmissions as observed at the remote unit 105. This leads to the same problems at cell/sector boundary areas as experiences in single-port MBMS.

In the case that SFBC+FSTD is used for MBMS transmission, the MBMS transmission points can be partitioned into four sets, with each set assigned to a different SFBC+FSTD transmission port. However, if the number of transmission points (e g, base units 110) visible to the remote unit 105 is less than or equal to four, this partitioning still does not guarantee that the transmission points visible to the remote unit 105 will have been assigned different SFBC+FSTD transmission ports. Thus, while it is possible that with good network planning, up to four transmission points visible to a particular remote unit 105 may be assigned different transmission ports, there is no guarantee that this will be the case. In general, it may be the case that multiple of the visible transmission points have been assigned the same transmission port, again leading to the problem of the signal-to-noise ratio of the resulting simulcast signal will depend on the relative phase of the transmissions as observed at the remote unit 105.

Thus, in order to have more robust performance, the system 100 minimizes the likelihood of signals near the cell boundaries cancelling by applying a random phase to the signals, as described in greater detail herein. Beneficially, applying the random phase, on average, achieves full diversity. Moreover, applying the random phase has no limit with respect to the number of transmission points for which full diversity can be achieved. Still further, applying the random phase has approximately the same reference symbol overhead as single port transmission.

In some embodiments, each base unit 110 is assigned the same single port transmission. However, the time-resource grid is partitioned into blocks (referred to as "phase blocks") of size K resource blocks by L subframes, where K≥1 and L≥1. For each phase block, the base unit 110 selects a random (or pseudo-random phase) on the interval of [0, 2π) radians and applies the selected phase to the signal transmitted in the phase block. As a result of the random (or pseudo-random) phasing of each K×L block at each base unit 110, the sum signal received at the remote unit 105 will be a random variable with average power equal to the sum of the average powers of the signals received from each base unit 110.

Figure 2:
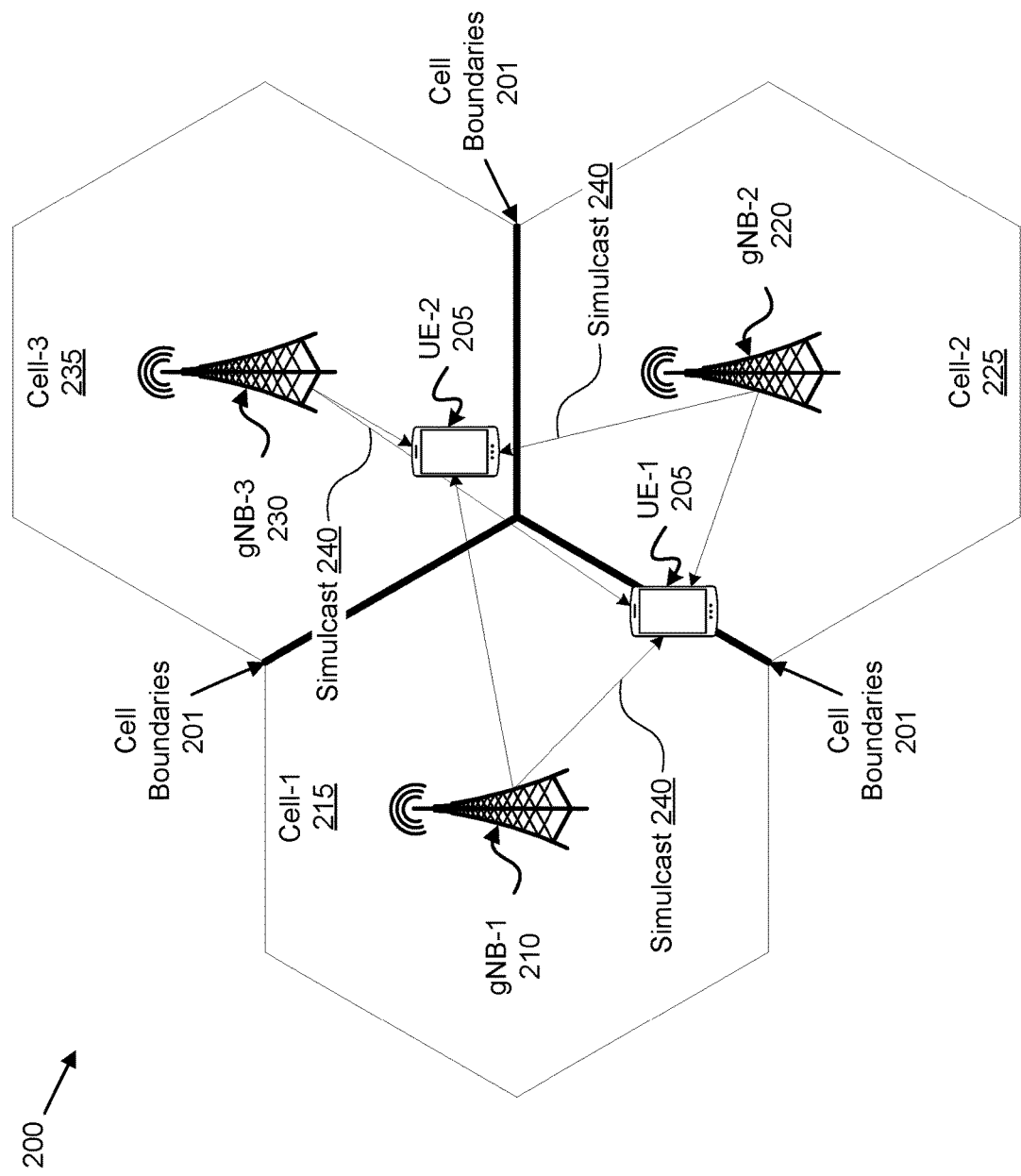
FIG. 2 is a block diagram illustrating one embodiment of a network architecture for applying a random phase to blocks within a multicast transmission.

FIG. 2 depicts a network architecture 200 for applying a random phase to blocks within a multicast transmission, according to embodiments of the disclosure. The depicted network architecture 200 involves multiple UEs and multiple gNBs. Each of the first UE 205 and second UE 207 may be one embodiment of the remote unit 105 described above. Likewise, each of the gNB 210, gNB 220, and gNB 230 may be an embodiment of the base unit 110 described above. Here, a first gNB 210 serves a first cell 215, a second gNB 220 serves a second cell 225, and a third gNB 230 serves a third cell 235.

In the depicted embodiment, the first gNB 210, second gNB 220, and third gNB 230 are all part of the same multicast group serving the same service area. As such, the same reference symbols are transmitted from all gNBs in the multicast group. Moreover, these same reference symbols are transmitted in the same resource elements (e.g., the same time/frequency resources). Note that for multicast transmission, in a given resource, the same encoded data symbol is transmitted from all gNBs in a multicast group.

The network architecture 200 shows boundaries 201 between the cells 215, 225, and 235. At a cell boundary 201, the simulcast signal 240 received at the first UE 205 when each of the first gNB 210 and second gNB 220 is transmitting individually may be very strong. However, when both gNBs transmit the same simulcast signals 240 at the same time, the two signals can add out-of-phase and cancel out, even though each simulcast signal 240, individually, may be very strong.

To avoid two simulcast signals 240 adding out-of-phase and cancelling out, each of the gNB 210, gNB 220, and gNB 230 applies random phases to the simulcast signals 240, e.g., applying a random phase to each K×L phase block of the signals. Here, each transmission point (e.g., each of the gNB 210, gNB 220, and gNB 230) partitions the time-resource grid into N "phase blocks" of size K by L. In one embodiment, the phase block is K resource elements by L symbols, where K and L are integers with K≥1 and L≥1, In another embodiment, the phase block is K resource blocks by L subframes, where K and L are integers with K≥1 and L≥1. For each phase block, the transmission point selects a random or pseudo-random phase on the interval of [0, 2π) radians and applies the selected phase to the signal transmitted in the phase block. Note that a "resource block" refers to the smallest unit of time-frequency resources that can be assigned to a UE 205 and comprises multiple subcarriers and resource elements. A "resource element" refers to a time-frequency resource of one subcarrier by one symbol. As used herein, a subframe is a portion of a radio frame. For example, a radio frame may be 10 ms in lengths and be divided into ten equally sized subframes of 1 ms. In an LTE system, a subframe may be divided into two slots, each slot containing either six or seven time-domain (OFDM) symbols (e.g., depending on a cyclic prefix used). In a 5G NR system, a subframe may be divided into slots of 14 time-domain symbols or into mini-slots of smaller lengths (e.g., 7, 4, or 2 symbols).

As a result of the random or pseudo-random phasing of each K×L block at each transmission point, the sum signal received at the first UE 205 will be a random variable with average power equal to the sum of the average powers of the signals received from each transmission point. Thus, if the complex gain from the i-th transmission point (e.g., gNB) for a given K×L block is $\alpha_i$ and the corresponding random phase is $\theta_i$ then the composite channel for the K×L block is given by $$\Sigma \alpha_i \exp(j\theta_i) \qquad \text{Eq. 1}$$

and the average power for the K×L block is given by $$\Sigma |\alpha_i|^2 \qquad \text{Eq. 2}$$

Due to the random phasing of each K×L block, the composite channel for each K×L block will be approximately independent of the channel for the adjacent blocks. As a result, the UEs in the simulcast service area (here, the first UE 205 and second UE 207) have knowledge of the boundaries of the block so that only reference symbols within the block are used to estimate the channel for the block. In various embodiments, the phase blocks are contiguous in both frequency and time. Beneficially, the use of such contiguous phase blocks minimizes the number of reference symbols needed to get a good channel estimate.

In certain embodiments, the granularity K and L in frequency and time as well as the associated RB and subframe boundaries of these K×L blocks can be signaled to the UE. In other embodiments, the granularity K and L in frequency and time as well as the associated RB and subframe boundaries of these K×L blocks are predetermined, for example defined by specification.

Note that the values of K and L are the same for all gNBs in the simulcast service area (e.g., MBMS service area), and furthermore, the boundaries of these K×L blocks are aligned among all gNBs in the simulcast service area. Moreover, the reference symbols transmitted from the different gNBs in the multicast group are the same except that the random phase for the phase block is also applied to the reference symbol. In one embodiment, the gNBs 210, 220, 230 communicate the phase block boundaries to the UEs 205, 207 via the SIB broadcast in each of the cells 215, 225, 235. In another embodiment, the gNBs 210, 220, 230 communicate the phase block boundaries to the UEs 205, 207 via an RRC signal unicast to each UE.

In various embodiments, granularity K and L in frequency and time, respectively, is small enough so as to achieve full diversity within a subframe or within a few subframes. However, too small a granularity will degrade the quality of the channel estimate due to reduced averaging in time and frequency or, alternatively, will impose the requirement for a higher density of reference symbols within each K×L block. One example of a phase block granularity that achieves full diversity without requiring a higher density of reference symbols to maintain the channel estimate quality is a block size of 4×1. Another example of a phase block granularity that achieves full diversity without requiring a higher density of reference symbols to maintain the channel estimate quality is a block size of 3×2.

Note that the needed density of the reference symbols (fraction of RE's with reference symbols) to accurately estimate the channel is a function of the Doppler frequency (which depends on the carrier frequency and the speed of the UE's) and the channel delay spread (e.g., the amount of multipath). In certain embodiments, when measured in resource elements ([K resource blocks]×[number of resource elements per RB (e.g. 12)]×[L subframes]×[number of symbols per subframe (e.g. 14)]), the size of the phase block is not less than the inverse of the fraction of symbols that contain reference symbols. In one embodiment, to allow for averaging of the channel estimates in the frequency domain, the size of the phase block in the frequency domain is larger than the inverse of the density of reference symbols in the frequency domain. In one embodiment, to allow for averaging of channel estimates in the time domain, the phase block in the time domain is larger than the inverse of the density of reference symbols in the time domain. In various embodiments, the density of the reference symbols in the frequency domain is two reference symbols four reference symbols per RB having 12 subcarriers (abbreviated as "2/12" or "4/12"). In such embodiments, the value of K (in resource blocks) is not to be less than 1 RB (for 4/12 density) or 2 RBs (for 2/12 density) to accurately estimate the channel. In various embodiments, the density of reference symbols in the time domain is four reference symbols per subframe (abbreviated "4/14"). In such embodiments, the value of L is not to be less than 1 subframe to accurately estimate the channel.

While the above description of the network architecture assumes the gNBs 210, 220, and 230 use single-port simulcast transmission (and are assigned the same single-port for transmission), the same principles may also be applied to multi-port simultcast transmissions, such as used in SFBC and/or FTSD.

Accordingly, MBMS performance may also be improved by combining transmit diversity (e.g., multi-port simulcast transmissions), such as SFBC or SFBC+F STD, from different gNBs with random phasing at each gNB. In one implementation, SFBC transmit diversity is be used to transmit the MBMS signal from each of the gNB 210, gNB 220, and gNB 230. Moreover, on top of this transmit diversity, each of the gNB 210, gNB 220, and gNB 230 applies a random phase for each K×L phase block transmitted from each antenna port. With this implementation, UEs with visibility of only a single eNB have the benefit of full diversity, due to the application of a random phase to each of the N phase blocks. Additionally, for UE's that have visibility of multiple gNBs, the port 0 K×L blocks received from different gNBs are randomly-phased with respect to each other (likewise with port 1 K×L blocks received from different gNBs).

Let $\alpha_i$ denote the complex gain from port 0 of the i-th gNB for a given K×L block, and similarly, let $\beta_i$ denote the complex gain from port 1 of the i-th gNB. Let the random phases for the port 0 and port 1 transmissions from the i-th eNB be given by $\theta_i$ and $\varphi_i$, respectively. With this notation, the composite channel for port 0 is given by Equation 1 (above) and the composite channel for port 1 is given by $$\Sigma \beta_i \exp(j\varphi_i) \qquad \text{Eq. 3.}$$

For SFBC transmission, the power of the received signal is then given by $$|\Sigma \alpha_i \exp(j\theta_i)|^2 + |\Sigma \beta_i \exp(j\varphi_i)|^2 \qquad \text{Eq. 4}$$

and the average power is given by $$\Sigma |\alpha_i|^2 + \Sigma |\beta_i|^2 \qquad \text{Eq. 5}$$

Note that due to the use of SFBC transmission from each of the gNB 210, gNB 220, and gNB 230, if a UE (e.g., the first UE 205) only has visibility of the i-th transmission point (e.g., gNB) so that $\alpha_j=0$ and $\beta_j=0$ for all $j \neq i$, then the UE still benefits from second order diversity since the received power is given by $$|\alpha_i|^2 + |\beta_i|^2 \qquad \text{Eq. 6}$$

Again, due to the random phasing of each K×L block from each port of transmission point, the composite channel for each K×L block will be approximately independent of the channel for the adjacent blocks.

Figure 3:
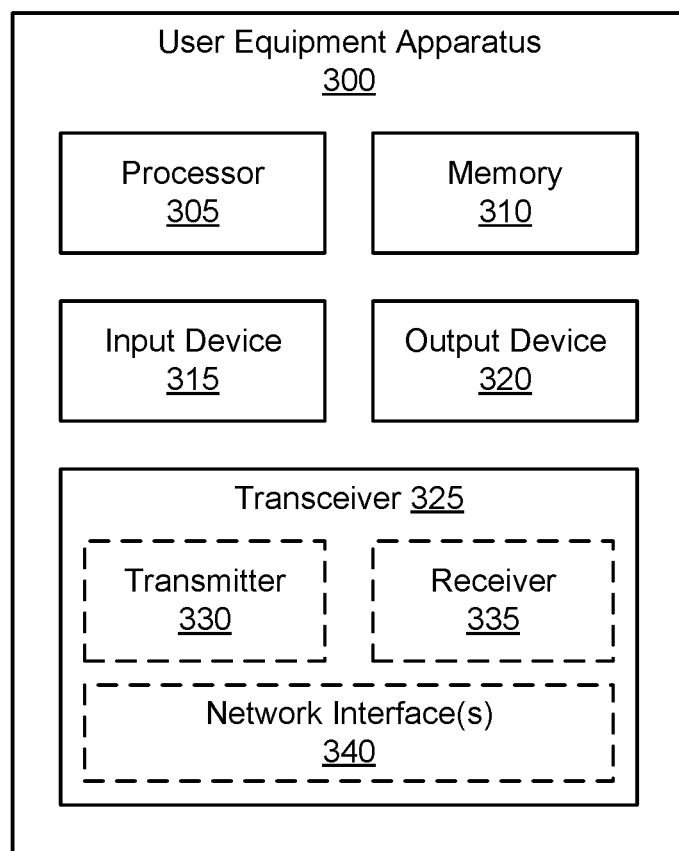
FIG. 3 is a schematic block diagram illustrating one embodiment of a user equipment apparatus for applying a random phase to blocks within a multicast transmission.

FIG. 3 depicts one embodiment of a user equipment apparatus 300 that may be used for applying a random phase to blocks within a multicast transmission, according to embodiments of the disclosure. The user equipment apparatus 300 may be one embodiment of the remote unit 105 and/or UE 205. Furthermore, the user equipment apparatus 300 may include a processor 305, a memory 310, an input device 315, an output device 320, and a transceiver 325. In some embodiments, the input device 315 and the output device 320 are combined into a single device, such as a touch screen. In certain embodiments, the user equipment apparatus 300 does not include any input device 315 and/or output device 320.

As depicted, the transceiver 325 includes at least one transmitter 330 and at least one receiver 335. Additionally, the transceiver 325 may support at least one network interlace 340. Here, the at least one network interface 340 facilitates communication with an eNB or gNB (e.g., using the Uu interface). Additionally, the at least one network interface 340 may include an interface used for communications with an UPF and/or AMF.

The processor 305, in one embodiment, may include any known controller capable of executing computer-readable instructions and/or capable of performing logical operations. For example, the processor 305 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 305 executes instructions stored in the memory 310 to perform the methods and routines described herein. The processor 305 is communicatively coupled to the memory 310, the input device 315, the output device 320, and the transceiver 325.

In various embodiments, the processor 305 receives (via the transceiver 325) a multicast transmission from at least one base unit. Additionally, the processor 305 identifies a plurality of phase blocks in the multicast transmission. Here, each phase block includes a plurality of resource blocks.

In some embodiments, the processor 305 receives (via the transceiver 325) a plurality of phase block boundaries from a base unit. Accordingly, the phase block boundaries are used to identify the plurality of phase blocks within the received multicast transmission. In one embodiment, the phase block boundaries are included in a SIB received via the transceiver 325. In another embodiment, the phase block boundaries are included in an RRC signal received via the transceiver 325.

The processor 305 performs channel estimation on the plurality of phase blocks and decodes the multicast transmission using the channel estimations. In some embodiments, the channel estimation for each phase block is performed independently of the channels estimations for others of the plurality of phase blocks. Moreover, each phase block may include one or more reference symbols. In such embodiments, the processor 305 performs channel estimation on a phase block using only the one or more reference symbols of that phase block.

The memory 310, in one embodiment, is a computer readable storage medium. In some embodiments, the memory 310 includes volatile computer storage media. For example, the memory 310 may include a RAM, including dynamic RAM ("DRAM"), synchronous dynamic RAM ("SDRAM"), and/or static RAM ("SRAM"). In some embodiments, the memory 310 includes non-volatile computer storage media. For example, the memory 310 may include a hard disk drive, a flash memory, or any other suitable non-volatile computer storage device. In some embodiments, the memory 310 includes both volatile and non-volatile computer storage media. In some embodiments, the memory 310 stores data relating to applying a random phase to blocks within a multicast transmission, for example storing phase block locations/boundaries, channel estimations, and the like. In certain embodiments, the memory 310 also stores program code and related data, such as an operating system or other controller algorithms operating on the user equipment apparatus 300 and one or more software applications.

The input device 315, in one embodiment, may include any known computer input device including a touch panel, a button, a keyboard, a stylus, a microphone, or the like. In some embodiments, the input device 315 may be integrated with the output device 320, for example, as a touchscreen or similar touch-sensitive display. In some embodiments, the input device 315 includes a touchscreen such that text may be input using a virtual keyboard displayed on the touchscreen and/or by handwriting on the touchscreen. In some embodiments, the input device 315 includes two or more different devices, such as a keyboard and a touch panel.

The output device 320, in one embodiment, may include any known electronically controllable display or display device. The output device 320 may be designed to output visual, audible, and/or haptic signals. In some embodiments, the output device 320 includes an electronic display capable of outputting visual data to a user. For example, the output device 320 may include, but is not limited to, an LCD display, an LED display, an OLED display, a projector, or similar display device capable of outputting images, text, or the like to a user. As another, non-limiting, example, the output device 320 may include a wearable display such as a smart watch, smart glasses, a heads-up display, or the like. Further, the output device 320 may be a component of a smart phone, a personal digital assistant, a television, a table computer, a notebook (laptop) computer, a personal computer, a vehicle dashboard, or the like.

In certain embodiments, the output device 320 includes one or more speakers for producing sound. For example, the output device 320 may produce an audible alert or notification (e.g., a beep or chime). In some embodiments, the output device 320 includes one or more haptic devices for producing vibrations, motion, or other haptic feedback. In some embodiments, all or portions of the output device 320 may be integrated with the input device 315. For example, the input device 315 and output device 320 may form a touchscreen or similar touch-sensitive display. In other embodiments, all or portions of the output device 320 may be located near the input device 315.

The transceiver 325 communicates with one or more network functions of a mobile communication network. The transceiver 325 operates under the control of the processor 305 to transmit messages, data, and other signals and also to receive messages, data, and other signals. For example, the processor 305 may selectively activate the transceiver (or portions thereof) at particular times in order to send and receive messages. The transceiver 325 may include one or more transmitters 330 and one or more receivers 335.

Figure 4:
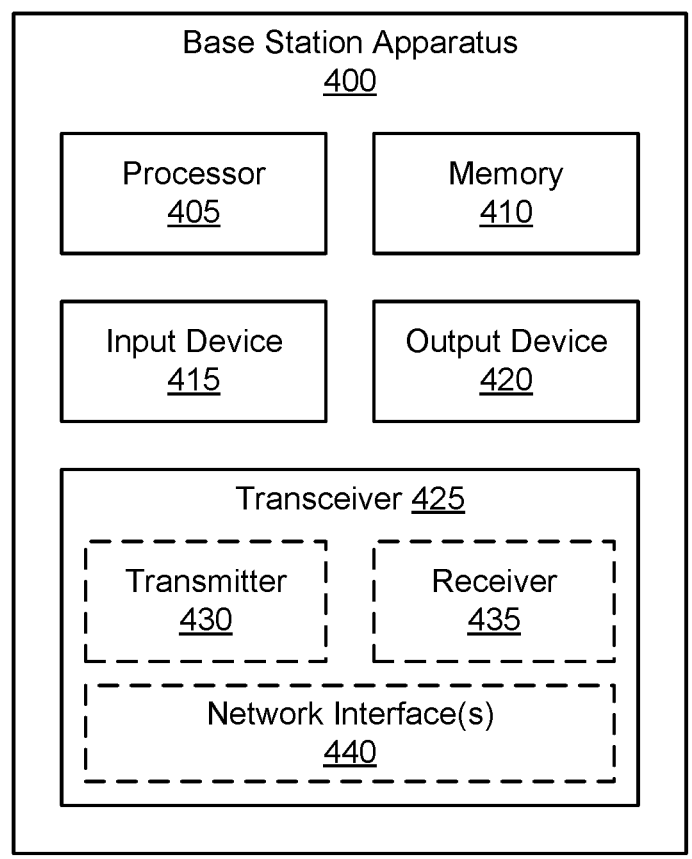
FIG. 4 is a schematic block diagram illustrating one embodiment of a base station apparatus for applying a random phase to blocks within a multicast transmission.

FIG. 4 depicts one embodiment of a base station apparatus 400 that may be used for applying a random phase to blocks within a multicast transmission, according to embodiments of the disclosure. The base station apparatus 400 may be one embodiment of the base unit 110 and/or the gNB 210. Furthermore, the base station apparatus 400 may include a processor 405, a memory 410, an input device 415, an output device 420, and a transceiver 425. In some embodiments, the input device 415 and the output device 420 are combined into a single device, such as a touch screen. In certain embodiments, the base station apparatus 400 does not include any input device 415 and/or output device 420.

As depicted, the transceiver 425 includes at least one transmitter 430 and at least one receiver 435. Additionally, the transceiver 425 may support at least one network interface 440. Here, the at least one network interface 440 facilitates communication with a remote unit 105, such as the UE 205, with other network functions in a mobile core network 140, such as the UPF 141, AMF 143, and the like.

The processor 405, in one embodiment, may include any known controller capable of executing computer-readable instructions and/or capable of performing logical operations. For example, the processor 405 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 405 executes instructions stored in the memory 410 to perform the methods and routines described herein. The processor 405 is communicatively coupled to the memory 410, the input device 415, the output device 420, and the transceiver 425.

In various embodiments, the processor 405 divides a downlink transmission into a plurality of phase blocks Here, each phase block includes a plurality of resource blocks. In certain embodiments, the phase block may extend over multiple subframes A phase block is sized K resource blocks by L subframes (denoted "K×L"), where K is an integer greater than or equal to one, and L is also an integer greater than or equal to one.

For each phase block, the processor 405 selects a random, or pseudo-random, phase (e.g., on the interval of $[0, 2\pi)$ radians) and applies the selected phase to signals corresponding to each of the plurality of phase blocks (e.g., applied to the signal transmitted in the block). The aggregate signal formed from applying the corresponding random or pseudo-random phases to each of the plurality of phase blocks is referred to as a "randomly-phased transmission." The processor 405 then controls the transceiver 425 to transmit the randomly-phased transmission to the at least one remote unit as multicast data.

In various embodiments, multiple base station apparatuses 400 simultaneously transmit randomly-phased transmissions corresponding to the same multicast data. For example, the base station apparatus 400 may belong to a multicast group, where each base station apparatus 400 in the multicast group selects a random (or pseudo-random) phase for each phase block independent of the others of the multicast group and applies the independently selected random/pseudo-random phase to the phase blocks. Such multiple, simultaneously transmitted multicast signals are referred to herein as simulcast transmissions. As a result of the random (or pseudo-random) phasing of each K×L block at each base station apparatus 400 (e.g., transmission point), the sum signal received at a remote unit (e.g., UE) is be a random variable with average power equal to the sum of the average powers of the signals received from each base station apparatus 400. In such embodiments, each base unit in the multicast group transmits the same encoded data in the respective randomly-phased transmissions.

In some embodiments, the processor 405 receives, via the transceiver 425, phase block boundaries from a network function. Here, the phase block boundaries define the RB and subframes boundaries of the K×L sized phase blocks. In certain embodiments, the phase block boundaries indicate the phase block size (e.g., K×L) and a reference resource block (e.g., RB index and subframe index). Further, the processor 405 divides the downlink transmission into a plurality of phase blocks based on the phase block boundaries. Note that the same phase block boundaries are received by each base station apparatus 400 in the multicast group.

In certain embodiments, the processor 405 controls the transceiver 425 to transmit the phase block boundaries to at least one remote unit served by the base station apparatus 400. This allows the remote unit(s) to divide the downlink transmission (e.g., the randomly-phased transmission) into the same phase blocks (e.g., same size and placement) as the base station apparatus 400. In one embodiment, the base station apparatus 400 broadcasts the phase block boundaries to all remote units in its coverage area via a system information block. In another embodiment, the base station apparatus 400 transmits (e.g., unicasts) the phase block boundaries to a remote unit via RRC signal.

The memory 410, in one embodiment, is a computer readable storage medium. In some embodiments, the memory 410 includes volatile computer storage media. For example, the memory 410 may include a RAM, including dynamic RAM ("DRAM"), synchronous dynamic RAM ("SDRAM"), and/or static RAM ("SRAM"). In some embodiments, the memory 410 includes non-volatile computer storage media. For example, the memory 410 may include a hard disk drive, a flash memory, or any other suitable non-volatile computer storage device. In some embodiments, the memory 410 includes both volatile and non-volatile computer storage media. In some embodiments, the memory 410 stores data relating to applying a random phase to blocks within a multicast transmission, for example storing phase block locations/boundaries, pseudo-random sequences, multicast data, and the like. In certain embodiments, the memory 410 also stores program code and related data, such as an operating system or other controller algorithms operating on the base station apparatus 400 and one or more software applications.

The input device 415, in one embodiment, may include any known computer input device including a touch panel, a button, a keyboard, a stylus, a microphone, or the like. In some embodiments, the input device 415 may be integrated with the output device 420, for example, as a touchscreen or similar touch-sensitive display. In some embodiments, the input device 415 includes a touchscreen such that text may be input using a virtual keyboard displayed on the touchscreen and/or by handwriting on the touchscreen. In some embodiments, the input device 415 includes two or more different devices, such as a keyboard and a touch panel.

The output device 420, in one embodiment, may include any known electronically controllable display or display device. The output device 420 may be designed to output visual, audible, and/or haptic signals. In some embodiments, the output device 420 includes an electronic display capable of outputting visual data to a user. For example, the output device 420 may include, but is not limited to, an LCD display, an LED display, an OLED display, a projector, or limiting, example, the output device 420 may include a wearable display such as a smart watch, smart glasses, a heads-up display, or the like. Further, the output device 420 may be a component of a smart phone, a personal digital assistant, a television, a table computer, a notebook (laptop) computer, a personal computer, a vehicle dashboard, or the like.

In certain embodiments, the output device 420 includes one or more speakers for producing sound. For example, the output device 420 may produce an audible alert or notification (e.g., a beep or chime). In some embodiments, the output device 420 includes one or more haptic devices for producing vibrations, motion, or other haptic feedback. In some embodiments, all or portions of the output device 420 may be integrated with the input device 415. For example, the input device 415 and output device 420 may form a touchscreen or similar touch-sensitive display. In other embodiments, all or portions of the output device 420 may be located near the input device 415.

The transceiver 425 operates under the control of the processor 405 to transmit messages, data, and other signals and also to receive messages, data, and other signals. For example, the processor 405 may selectively activate the transceiver (or portions thereof) at particular times in order to send and receive messages. The transceiver 425 may include one or more transmitters 430 and one or more receivers 435.

Figure 5:
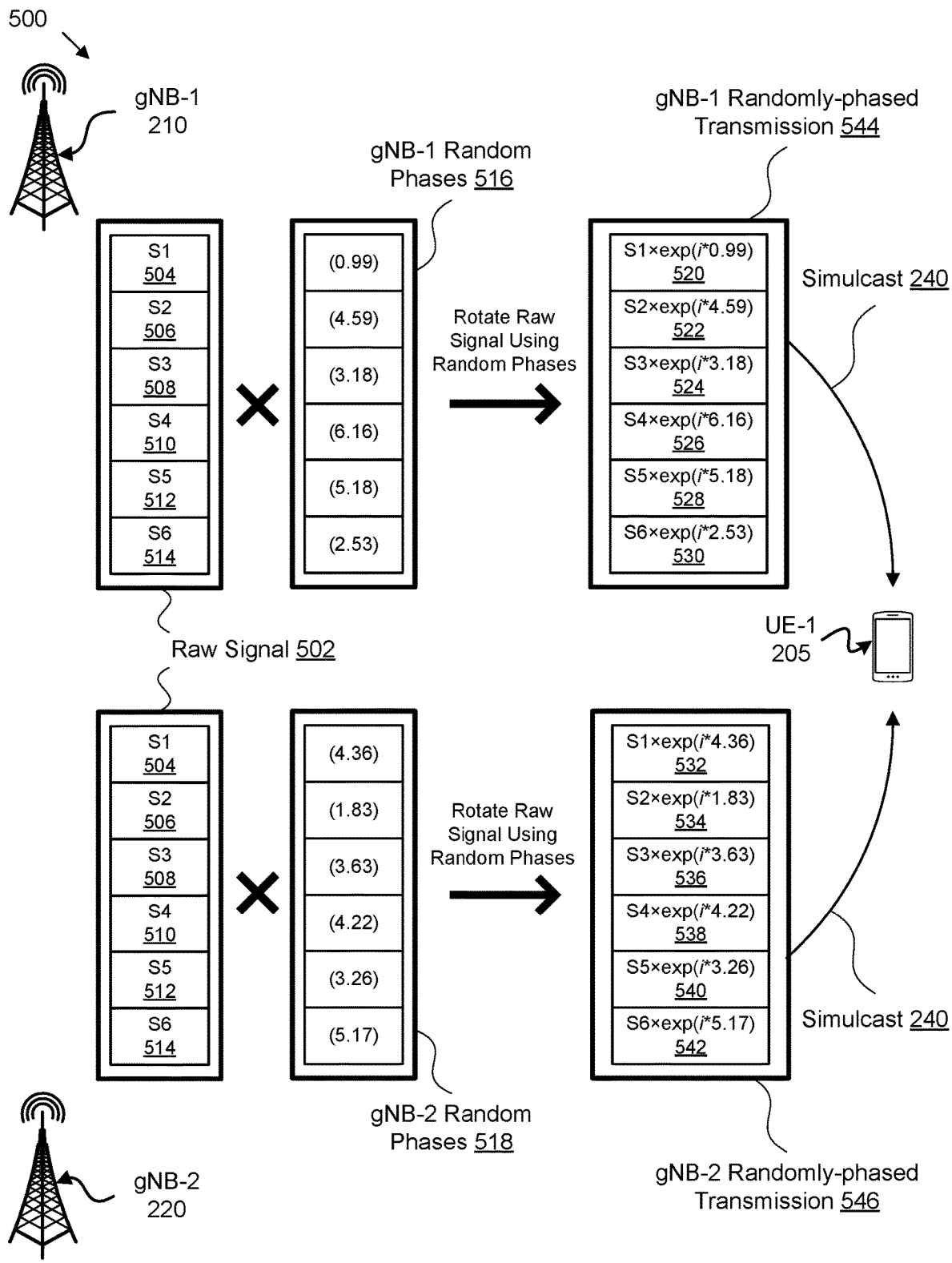
FIG. 5 is a diagram illustrating one embodiment of applying a random phase to phase block.

FIG. 5 depicts a first procedure 500 for applying a random phase to phase block, according to embodiments of the disclosure. The first procedure 500 involves the first UE 205, the first gNB 210, and the second gNB 220. At the onset, the gNBs 210, 220 prepare the same raw signal 502 corresponding to the same multicast data (e.g., for the simulcast 240). The raw signal 502 includes a first signal ("S1") 504 corresponding to a first phase block, a second signal ("S2") 506 corresponding to a second phase block, a third signal ("S3") 508 corresponding to a third phase block, a fourth signal ("S4") 510 corresponding to a fourth phase block, a fifth signal ("S5") 512 corresponding to a fifth phase block, and a sixth signal ("S6") 514 corresponding to a sixth phase block.

Next, the first gNB 210 generates a first set 516 of random phases, each random phase in the first set 516 corresponding to one of the phase blocks (e.g. of the raw signal 502). Likewise, the second gNB 220 generates a second set 518 of random phases, each random phase in the second set 518 corresponding to one of the phase blocks. Each gNB 210, 220 applies the generated random phases (e.g. contained in the first set 516 and the second set 518, respectively) to the raw signal 502. Thus, the first gNB 210 produces a first randomly-phased transmission 544 and the second gNB 220 produces a second randomly-phased transmission 546.

In the first randomly-phased transmission 544, the first phase from the first set of random phases is applied to the first signal 504 to form a first randomly-phased signal 520. Specifically, the random phase is added to the phase of the raw signal, e.g. by multiplying the signal as shown in Equation 7, below:

$$S_A = S_r \times e^{(i \times \theta_j)} \quad \text{Eq. 7}$$

where $S_A$ is the randomly-phased signal, $S_r$ is the raw signal, i denotes the square root of $-1$, and $\theta_j$ is the random phase Thus, each gNB rotates the phase of the raw signal using the randomly generated value on the interval $[0, 2\pi)$ radians.

Similarly, a second phase from the first set of random phases is applied to the second signal 506 to form a second randomly-phased signal 522. A third phase from the first set of random phases is applied to the third signal 508 to form a third randomly-phased signal 524. A fourth phase from the first set of random phases is applied to the fourth signal 510 to form a fourth randomly-phased signal 526. A fifth phase from the first set of random phases is applied to the fifth signal 512 to form a fifth randomly-phased signal 528. A sixth phase from the first set of random phases is applied to the sixth signal 514 to form a sixth randomly-phased signal 530.

Similarly, a seventh randomly-phased signal 532, an eighth randomly-phased signal 534, a ninth randomly-phased signal 536, a tenth randomly-phased signal 538, and the eleventh randomly-phased signal 540, and a twelfth randomly-phased signal 542 are formed by applying the second set 518 of random phases to the raw signal 502. Note that the first randomly-phased signal 520 has a different phase applied to it than the seventh randomly-phased signal, even though random phases are applied to the same first signal 504. Because the first gNB 210 and the second gNB 220 each select the random phase independent of another, there is a very low probability of the first randomly-phased signal 520 and the seventh randomly-phased signal 532 having the same phase. Further, the risk of unsuccessful reception of the simulcast signals 240 is mitigated by applying a different, independently-selected random phase to each phase block.

Figure 6:
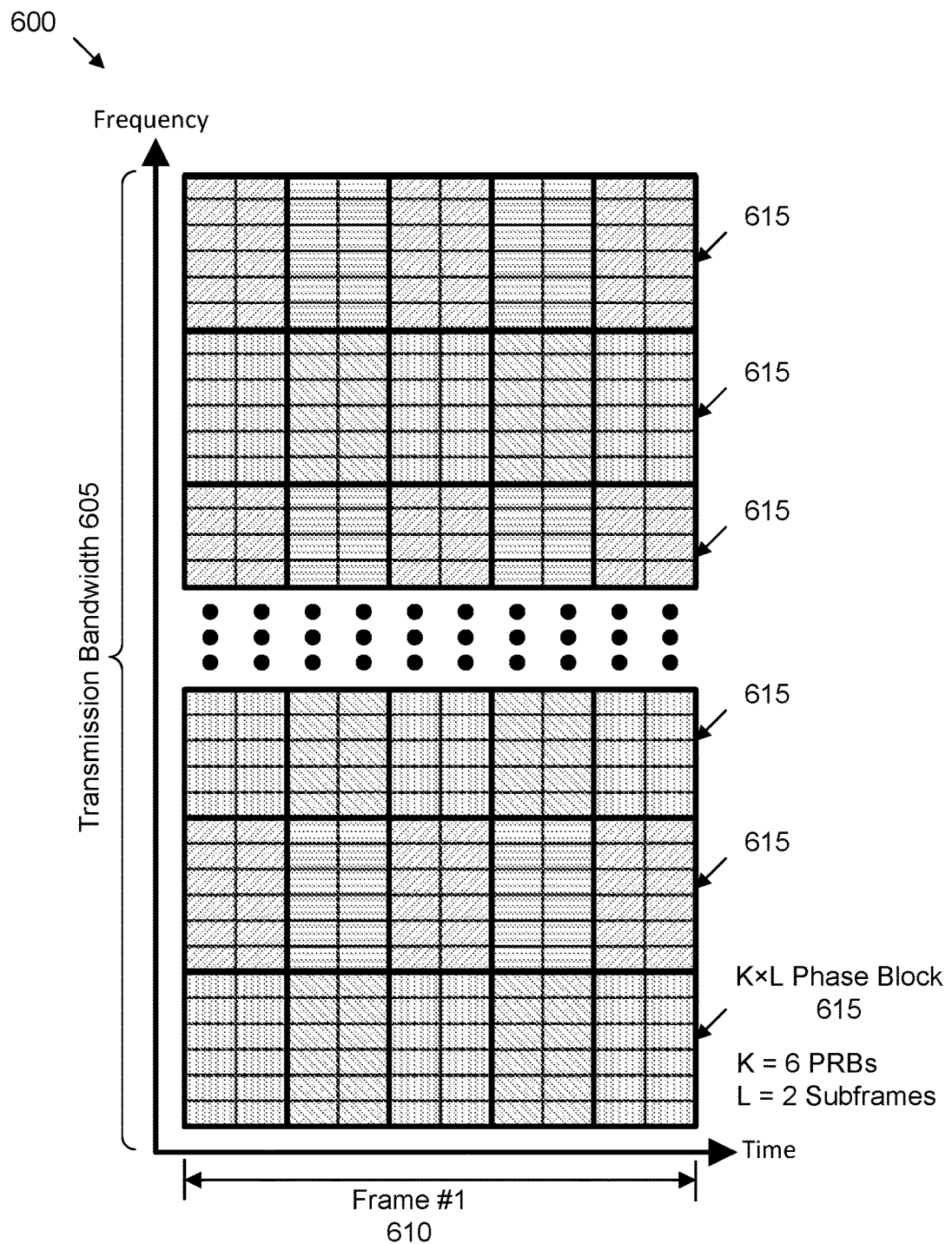
FIG. 6 is a diagram illustrating one embodiment of a time-resource grid for applying a random phase to blocks within a multicast transmission.

FIG. 6 depicts a time-resource grid 600, according to embodiments of the disclosure. The resource grid 600 is shown over a transmission bandwidth 605 (in frequency) and over a first frame 610 (in time) and includes multiple physical resource blocks (PRBs) over multiple subframes. In the depicted example, the frame 610 includes ten subframes; however, other implementations may have different amounts of subframes per frame. Moreover, while the depicted subframes are of equal lengths, other implementations may utilize subframes of differing lengths. Note that each PRB includes multiple subcarriers (e.g., 12 subcarriers) and each subframe includes multiple (OFDM) symbols (e.g., 7 OFDM symbols).

The time-resource grid 600 is partitioned into K×L phase blocks 615, each phase block 615 containing K number of PRBs and L number of subframes. For ease of illustration, the depicted example shows the K×L phase blocks 615 having a granularity of six PRBs and two subframes; however, other implementations may have phase blocks of different sizes (e.g., different values of K and/or L).

In certain embodiments, the K×L phase blocks 615 may coincide with a resource block groups ("RGB") used by the transmission point; however, in other embodiments, the K×L phase blocks 615 are selected separately from and have different sizes and/or locations within the time-resource grid than the RGBs. Note that an RBG is typically a fixed size, the size selected based on the system bandwidth (e.g., transmission bandwidth 605). In various embodiments, the size of the K×L phase blocks 615 is not based on the transmission bandwidth 605 (e.g., the size is selected independently of the size of the transmission bandwidth 605).

In certain embodiments, the size and placement of the K×L phase blocks 615 is selected to ensure an integral number of K×L phase blocks 615 fit within the time-resource grid 600. In other embodiments, partitioning the time-resource grid 600 into the K×L phase blocks 615 will result in a remainder number of PRBs outside the K×L phase blocks 615. In one embodiment, these remainder PRBs are grouped into one or more "remainder" phase blocks and a random phase applied to each remainder phase block. In another embodiment, the remainder PRBs are given the same applied phase as a nearby K×L phase blocks 615, effectively forming a larger phase block, for example at an edge of the transmission bandwidth 605. In yet another embodiment, no random phase is applied to these remainder PRBs.

As described above, a transmission point (e.g., a gNB) partitions the time-resource grid into the K×L phase blocks 615 and selects a random (or pseudo-random) phase for each K×L phase block 615. The transmission point applied the random phase to the signal(s) of each K×L phase block 615 and transmits the resulting signals. As used herein, the K×L phase blocks 615 with applied random phase is referred to as a randomly-phased transmission.

Figure 7:
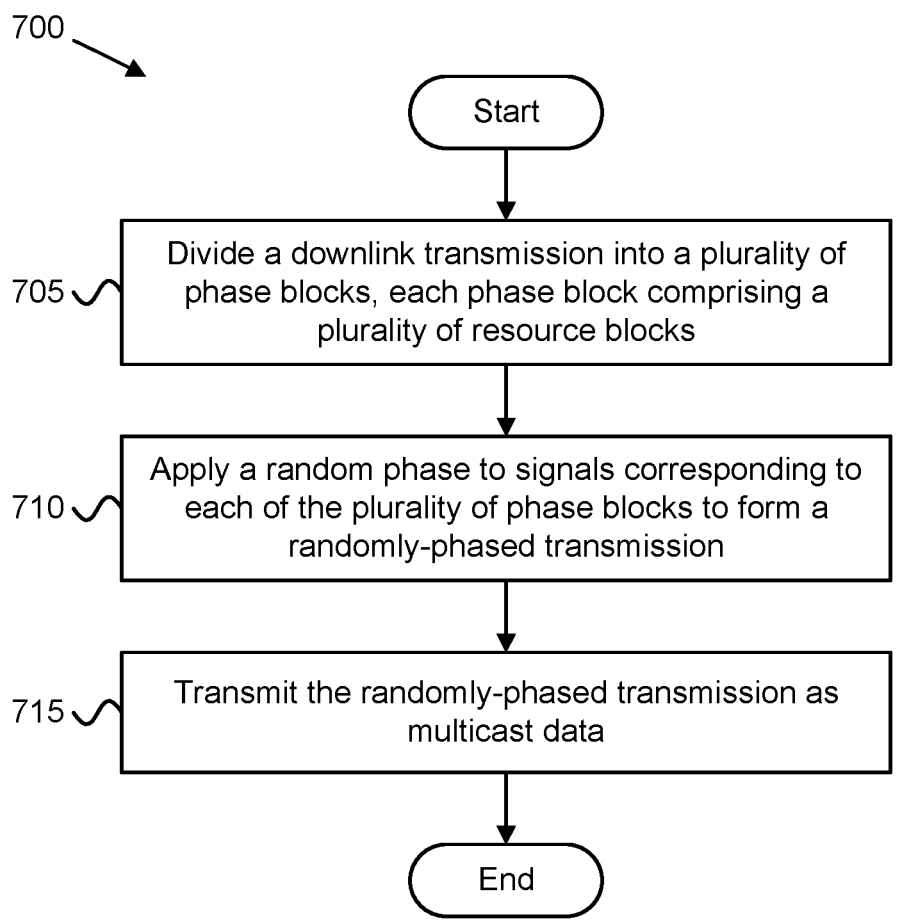
FIG. 7 is a flowchart diagram illustrating one embodiment of a method for applying a random phase to blocks within a multicast transmission.

FIG. 7 depicts a method 700 for applying a random phase to blocks within a multicast transmission, according to embodiments of the disclosure. In some embodiments, the method 700 is performed by a transmission point, such as the base unit 110, the gNB 210, the gNB 220, the gNB 230, and/or the base station apparatus 400, described above. In some embodiments, the method 700 is performed by a processor executing program code, for example, a microcontroller, a microprocessor, a CPU, a GPU, an auxiliary processing unit, a FPGA, or the like.

The method 700 begins and divides 705 a downlink transmission into a plurality of phase blocks. Here, each phase block includes a plurality of resource blocks. Moreover, a phase block may extend over a one or more subframes. In certain embodiments, the transmission point receives phase block boundaries for the plurality of phase blocks from a network entity, wherein dividing 705 the downlink transmission into the plurality of phase blocks includes partitioning the downlink transmission based on the received phase block boundaries.

The method 700 includes applying 710 a random phase to signals corresponding to each of the plurality of phase blocks to form a randomly-phased transmission. In various embodiments, applying 710 the random phase includes selecting a random or pseudorandom phase value on the interval [0, 2π) radians and applying the selected phase to the signal.

In certain embodiments, the transmission point belongs to a multicast group that includes multiple transmission points. Here, each transmission point in the multicast group receives the same phase block boundaries and independently selects the random (or pseudorandom) phase for each phase block. Moreover, the transmission point may transmit phase block boundaries to a remote unit served by the transmission point, for example, via SIB or RRC signal.

The method 700 includes transmitting 715 the randomly-phased transmission as multicast data. The method 700 ends. In some embodiments, each transmission point in the multicast group simultaneously multicasts random-phased transmissions corresponding to the same multicast data. In such embodiments, each base unit in the multicast group transmits the same encoded data in the respective randomly-phased transmissions.

Figure 8:
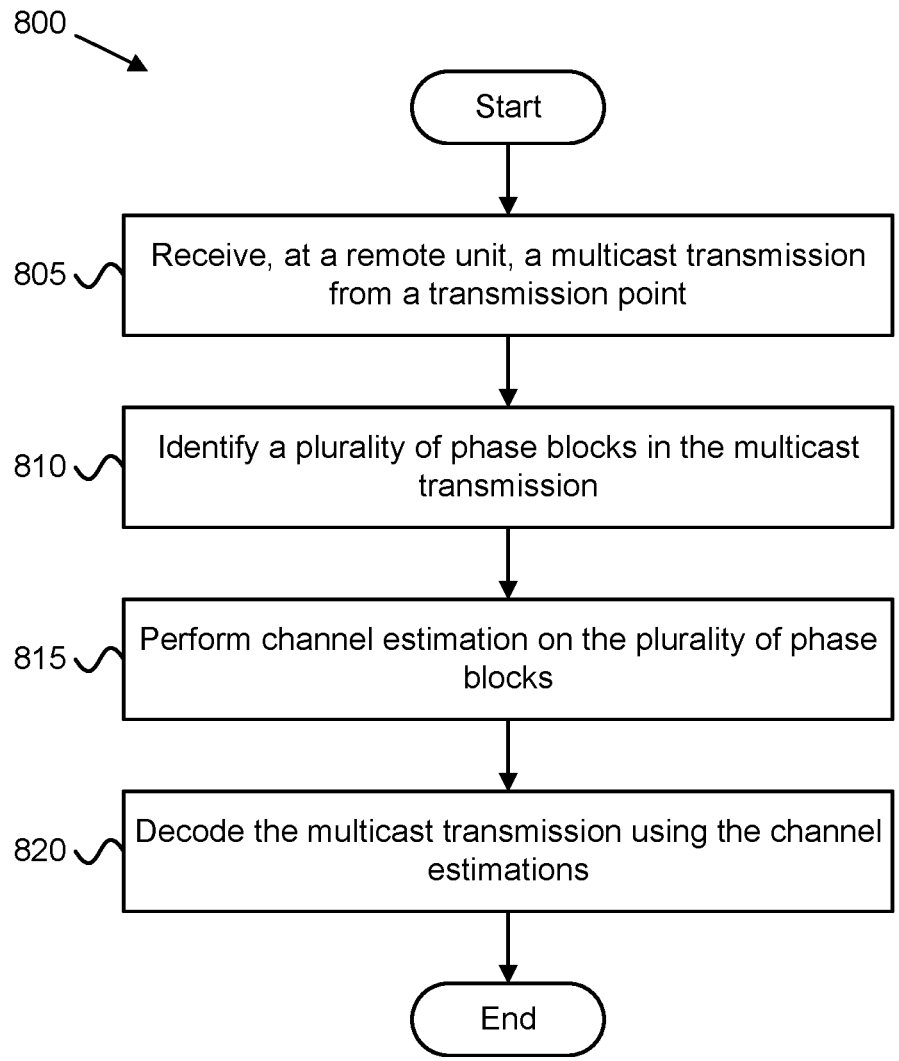
FIG. 8 is a flowchart diagram illustrating another embodiment of a method for applying a random phase to blocks within a multicast transmission.

FIG. 8 depicts a method 800 for applying a random phase to blocks within a multicast transmission, according to embodiments of the disclosure. In some embodiments, the method 800 is performed by a remote unit, such as the remote unit 105, the UE 205, and/or the user equipment apparatus 300, described above. In some embodiments, the method 800 is performed by a processor executing program code, for example, a microcontroller, a microprocessor, a CPU, a GPU, an auxiliary processing unit, a FPGA, or the like.

The method 800 begins and receives 805 a multicast transmission from a transmission point. Examples of transmission point include the base unit 110, the gNB 210, the gNB 220, the gNB 230, and/or the base station apparatus 400. In certain embodiments, receiving 805 the multicast transmission includes receiving the transmissions from multiple transmission points. In such embodiments, phase blocks within the transmissions may have different phases applied to them by the transmitting transmission point.

The method 800 includes identifying 810a plurality of phase blocks in the multicast transmission. Here, each phase block may include a plurality of resource blocks. In certain embodiments, a phase block extends over multiple subframes. In various embodiments, identifying 810 the plurality phase blocks includes receiving a plurality of phase block boundaries from the transmission point and partitioning the multicast transmission based on the plurality of phase block boundaries. In one embodiment, receiving the plurality of phase block boundaries includes receiving the phase block boundaries in a system information block. In another embodiment, receiving the plurality phase block boundaries includes receiving the phase block boundaries via RRC signaling.

The method 800 includes performing 815 channel estimation on the plurality of phase blocks and decoding 820 the multicast transmission using the channel estimations. The method 800 ends. In some embodiments, performing 815 the channel estimations includes estimating the channel of each phase block independently of the channel estimations the other phase blocks. In various embodiments, each phase block includes one or more reference symbols. In such embodiments, performing 815 channel estimation on a phase block includes using only the reference signals in that phase block to estimate the channel.

Disclosed herein is a first apparatus for applying a random phase to blocks within a multicast transmission. The first apparatus may be a transmission point, such as the base unit 110, the gNB 210, the gNB 220, the gNB 2030, and/or the base station apparatus 400, described above. The first apparatus includes a processor and a transceiver that communicates with at least one remote unit. The processor divides a downlink transmission into a plurality of phase blocks. Here, each phase block includes a plurality of resource blocks. The processor applies a random phase to signals corresponding to each of the plurality of phase blocks to form a randomly-phased transmission and the transceiver transmits the randomly-phased transmission to the at least one remote unit as multicast data.

In certain embodiments of the first apparatus, the transceiver receives phase block boundaries from a network function, wherein the processor divides the downlink transmission into a plurality of phase blocks based on the phase block boundaries. In some embodiments, the first apparatus belongs to a multicast group, the multicast group including a plurality of base units. In such embodiments, each base unit in the multicast group receives the phase block boundaries, selects a random phase for each phase block independent of the others of the multicast group, and simultaneously multicasts randomly-phased transmissions. Here, each base unit in the multicast group transmits the same encoded data in the respective randomly-phased transmissions.

In certain embodiments of the first apparatus, the transceiver transmits phase block boundaries to the at least one remote unit served by the base unit, said phase block boundaries corresponding to the plurality of phase blocks. In one embodiment, transmitting the phase block boundaries to the at least one remote unit includes broadcasting the phase block boundaries in a system information block. In another embodiment, transmitting the phase block boundaries to the at least one remote unit includes transmitting the phase block boundaries in a radio resource control signal.

Disclosed herein is a second apparatus for applying a random phase to blocks within a multicast transmission. The second apparatus may be a UE, such as the remote unit 105, the UE 205, and/or the user equipment apparatus 300, described above. The second apparatus includes a processor and a transceiver that communicates with a base unit in a mobile communication network. The processor receives a multicast transmission from the base unit and identifies a plurality of phase blocks in the multicast transmission, each phase block including a plurality of resource blocks. The processor also performs channel estimation on the plurality of phase blocks and decodes the multicast transmission using the channel estimations.

In certain embodiments of the second apparatus, the channel estimation for each phase block is performed independently of the channels estimations for others of the plurality of phase blocks. In certain embodiments of the second apparatus, each phase block includes one or more reference symbols, wherein performing channel estimation on a phase block includes using the one or more reference symbols of that phase block to estimate the channel.

In certain embodiments of the second apparatus, the processor further receives a plurality of phase block boundaries from the base unit, wherein identifying the plurality of phase blocks in the multicast transmission based the plurality of phase block boundaries. In one embodiment, receiving the phase block boundaries includes receiving the phase block boundaries in a system information block. In another embodiment, receiving the phase block boundaries includes receiving the phase block boundaries in a radio resource control signal.

Disclosed herein is a first method for applying a random phase to blocks within a multicast transmission. The first method may be performed by a transmission point, such as the base unit 110, the gNB 210, the gNB 220, the gNB 230, and/or the base station apparatus 400. The first method includes dividing, by a base unit, a downlink transmission into a plurality of phase blocks. Here, each phase block includes a plurality of resource blocks. The first method also includes applying a random phase to signals corresponding to each of the plurality of phase blocks to form a randomly-phased transmission and transmitting the randomly-phased transmission as multicast data.

In some embodiments, the first method also includes receiving phase block boundaries from a network function. In such embodiments, dividing a downlink transmission into a plurality of phase blocks is based on the phase block boundaries. In certain embodiments, the base unit belongs to a multicast group, said multicast group comprising a plurality of base units. In such embodiments, each base unit in the multicast group receives the phase block boundaries, selects a random phase for each phase block independent of the others of the multicast group, and simultaneously multicasts randomly-phased transmissions. Here, each base unit in the multicast group transmits the same encoded data in the respective randomly-phased transmissions.

In some embodiments, the first method also includes transmitting phase block boundaries to a remote unit served by the base unit, said phase block boundaries corresponding to the plurality of phase blocks. In one embodiment, transmitting the phase block boundaries to a remote unit comprises broadcasting the phase block boundaries in a system information block. In another embodiment, transmitting the phase block boundaries to a remote unit comprises transmitting the phase block boundaries in a radio resource control signal.

Disclosed herein is a second method for applying a random phase to blocks within a multicast transmission. The second method may be performed by a UE, such as the remote unit 105, the UE 205, and/or the user equipment apparatus 300, described above. The second method includes receiving, at a remote unit, a multicast transmission from a base unit and identifying, by the remote unit, a plurality of phase blocks in the multicast transmission, each phase block including a plurality of resource blocks. The second method also includes performing channel estimation on the plurality of phase blocks and decoding the multicast transmission using the channel estimations.

In certain embodiments of the second method, the channel estimation for each phase block is performed independently of the channels estimations for others of the plurality of phase blocks. In certain embodiments of the second apparatus, each phase block includes one or more reference symbols, wherein performing channel estimation on a phase block includes using the one or more reference symbols of that phase block to estimate the channel.

In some embodiments, the second method includes receiving a plurality of phase block boundaries from the base unit, wherein identifying the plurality of phase blocks in the multicast transmission based the plurality of phase block boundaries. In one embodiment, receiving the phase block boundaries includes receiving the phase block boundaries in a system information block. In another embodiment, receiving the phase block boundaries includes receiving the phase block boundaries in a radio resource control signal.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
dividing, by a base unit, a downlink transmission for a selected user equipment into a plurality of phase blocks, each phase block comprising a plurality of resource blocks;
applying a random phase to signals corresponding to each of the plurality of phase blocks to form a randomly-phased transmission to the selected user equipment, wherein the randomly-phased transmission include the plurality of phase blocks, each phase block having a different random phase applied; and
transmitting the randomly-phased transmission as multicast data.

2. The method of claim 1, further comprising receiving phase block boundaries from a network function, wherein dividing a downlink transmission into a plurality of phase blocks is based on the phase block boundaries.

3. The method of claim 2, wherein the base unit belongs to a multicast group, said multicast group comprising a plurality of base units, wherein each base unit in the multicast group receives the phase block boundaries, selects a random phase for each phase block independent of the others of the multicast group, and simultaneously multicasts randomly-phased transmissions, wherein each base unit in the multicast group transmits the same encoded data in the respective randomly-phased transmissions.

4. The method of claim 1, further comprising transmitting phase block boundaries to a remote unit served by the base unit, said phase block boundaries corresponding to the plurality of phase blocks.

5. The method of claim 4, wherein transmitting the phase block boundaries to a remote unit comprises broadcasting the phase block boundaries in a system information block.

6. The method of claim 4, wherein transmitting the phase block boundaries to a remote unit comprises transmitting the phase block boundaries in a radio resource control signal.

7. An apparatus comprising:
a transceiver that communicates with at least one remote unit; and
a processor that:
divides a downlink transmission for a selected remote unit of the at least one remote unit into a plurality of phase blocks, each phase block comprising a plurality of resource blocks; and
applies a different random phase to each of the plurality of phase blocks to form a randomly-phased transmission to the selected remote unit,
wherein the transceiver transmits the randomly-phased transmission to the at least one remote unit as multicast data.

8. The apparatus of claim 7, wherein the transceiver receives phase block boundaries from a network function, wherein the processor divides the downlink transmission into a plurality of phase blocks based on the phase block boundaries.

9. The apparatus of claim 8, wherein the apparatus belongs to a multicast group, said multicast group comprising a plurality of base units, wherein each base unit in the multicast group receives the phase block boundaries, selects a random phase for each phase block independent of the others of the multicast group, and simultaneously multicasts randomly-phased transmissions, wherein each base unit in the multicast group transmits the same encoded data in the respective randomly-phased transmissions.

10. The apparatus of claim 7, wherein the transceiver transmits phase block boundaries to the at least one remote unit served by the base unit, said phase block boundaries corresponding to the plurality of phase blocks, wherein transmitting the phase block boundaries to the at least one remote unit comprises one of: broadcasting the phase block boundaries in a system information block, and transmitting the phase block boundaries in a radio resource control signal.

11. A method comprising:
receiving, at a remote unit, a multicast transmission from a base unit;
identifying, by the remote unit, a plurality of phase blocks in the multicast transmission, each phase block having a different random phase applied and comprising a plurality of resource blocks;
performing channel estimation on the plurality of phase blocks; and
decoding the multicast transmission using the channel estimations.

12. The method of claim 11, wherein the channel estimation for each phase block is performed independently of the channels estimations for others of the plurality of phase blocks.

13. The method of claim 11, wherein each phase block includes one or more reference symbols, wherein performing channel estimation on a phase block comprises using the one or more reference symbols of that phase block to estimate the channel.

14. The method of claim 11, further comprising receiving a plurality of phase block boundaries from the base unit, wherein identifying the plurality of phase blocks in the multicast transmission based the plurality of phase block boundaries.

15. The method of claim 14, wherein receiving the phase block boundaries comprises receiving the phase block boundaries in a system information block.

16. The method of claim 14, wherein receiving the phase block boundaries comprises receiving the phase block boundaries in a radio resource control signal.

17. An apparatus comprising:
   a transceiver that communicates with a base unit in a mobile communication network; and
   a processor that:
   receives a multicast transmission from the base unit;
   identifies a plurality of phase blocks in the multicast transmission, each phase block having a different random phase applied and comprising a plurality of resource blocks;
   performs channel estimation on the plurality of phase blocks; and
   decodes the multicast transmission using the channel estimations.

18. The apparatus of claim 17, wherein the channel estimation for each phase block is performed independently of the channels estimations for others of the plurality of phase blocks.

19. The apparatus of claim 17, wherein each phase block includes one or more reference symbols, wherein performing channel estimation on a phase block comprises using the one or more reference symbols of that phase block to estimate the channel.

20. The apparatus of claim 17, wherein the processor further receives a plurality of phase block boundaries from the base unit, wherein identifying the plurality of phase blocks in the multicast transmission based the plurality of phase block boundaries, wherein receiving the phase block boundaries comprises one of receiving the phase block boundaries in a system information block and receiving the phase block boundaries in a radio resource control signal.

* * * * *